Patented Feb. 13, 1934

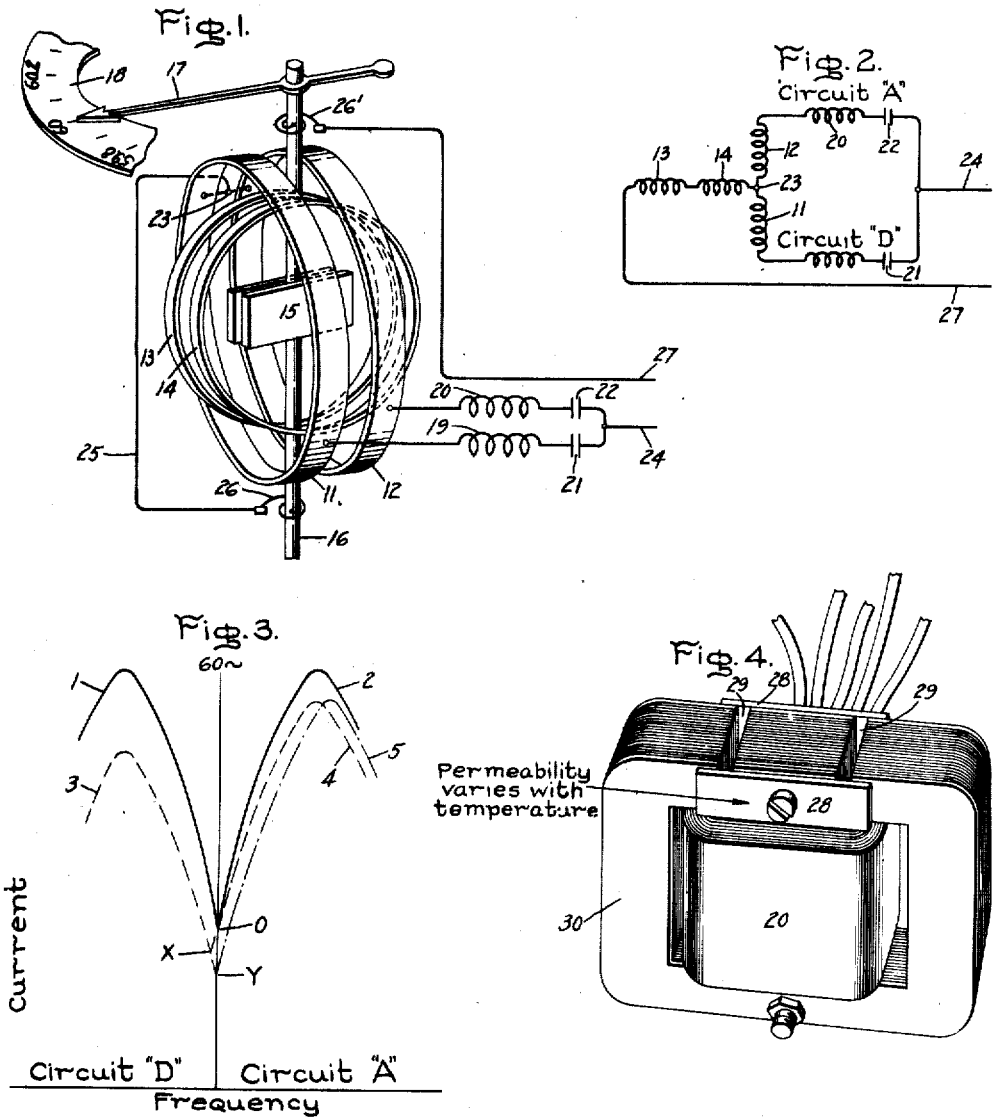

1,947,187

UNITED STATES PATENT OFFICE 1,947,187

TEMPERATURE COMPENSATION FOR ELECTRICAL DEVICES

Earl W. Clark, East Lynn, and Ernest Gilbertson, Lynn, Mass., assignors to General Electric Company, a corporation of New York Application October 30, 1931. Serial No. 572,204

9 Claims. (Cl. 172—245)

Our invention relates to methods and means for compensating for temperature errors in electrical instruments and devices, particularly those employing multiple circuits. Although not limited thereto our invention is particularly useful in compensating for unequal variations occurring in the currents in the opposing coils of frequency meters of the multiple coil type as a result of changes in temperature, and the invention will be described as applied for such use.

In frequency responsive devices of this type opposed coils are respectively connected in series with impedances having different electrical constants in circuits carrying currents of a frequency which is to be determined. The resultant magnetic flux produced by the pair of coils reacts with magnetic fields produced by one or more other elements of the device to give an indication of the frequency of the electric currents.

Since the two parallel circuits have different electrical constants, variations in frequency will change the relative magnitudes and phase relationships of the currents flowing therein, thereby changing the magnitude or direction of the resultant torque acting upon the indicating element. However, also owing to the fact that the parallel circuits have different electrical constants, variations in temperature affect the constants unequally and the relationships between the currents flowing in said circuits tend to vary with temperature. The most marked effect is ordinarily the unequal variation in the resistances of the two circuits with variations in temperature.

It is the primary object of our invention to provide means for compensating temperature errors in parallel circuits of this type and in particular to provide a frequency responsive device in which the temperature errors are compensated for. In carrying our invention into effect, we provide an inductive reactance in one of the parallel circuits with a magnetic core, a portion of which is composed of a material having a permeability which varies with temperature. By selecting a material of suitable characteristics, we may, within the scale range of the instrument, compensate for a change in the distribution of current between the two circuits due to temperature variation by causing a suitable variation in the reactance of one of the circuits. Other objects and advantages will become apparent as the description proceeds.

The features of our invention which we believe to be novel and patentable will be pointed out in claims appended hereto. To afford a more complete understanding of our invention, reference is made in the following description to the accompanying drawing in which Fig. 1 illustrates a type of frequency meter to which our invention is applicable; Fig. 2 represents schematically the electrical circuits of such a meter; Fig. 3 represents the curves of current plotted against frequency for each of the parallel circuits of said meter under different conditions of temperature; and Fig. 4 represents in perspective a reactance coil provided with temperature compensating means.

Referring now more in detail to the drawing in which like reference characters refer to like parts throughout, our invention may be applied to a frequency meter of the type disclosed in U. S. Patent No. 1,674,482 to Theodore A. Rich, issued June 19, 1928, in which a pair of stationary coils 11 and 12 cooperate with a pair of movable coils 13 and 14 and a magnetic vane 15. The shaft 16 which supports the movable elements of the instrument carries a pointer 17 cooperating with a scale 18.

Inductive reactances 19 and 20, and condensers or capacitative reactances 21 and 22 are connected in series with the coils 11 and 12 respectively so as to form two parallel circuits D and A from the common terminal 23 of coils 11 and 12 to the lead 24. A circuit is completed from terminal 23, through conductor 25, hair spring 26, a conductor (not shown) carried by shaft 16, the coils 13 and 14 in series, another conductor (not shown), hair spring 26', and lead 27. The leads 24 and 27 are connected across a voltage the frequency of which is to be measured.

The circuits D and A constitute tuned resonant circuits having resonant frequencies indicated by the peaks of curves 1 and 2 in Fig. 3 which show the relationship between current and frequency in circuits D and A respectively at a normal temperature. Resonant frequencies are selected which lie well beyond the operating range of the instrument. Curves 1 and 2 intersect at a point 0 corresponding to an intermediate frequency. At this frequency, which in the instrument illustrated is 60 cycles, the currents in circuits "D" and "A" are equal so that differential torques acting upon the moving element are neutralized and pointer 17 remains at the center of the scale 18. At other frequencies the currents will be unbalanced and a differential torque will cause a deflection of the instrument in one direction or the other dependent upon the frequency in a manner well known by those skilled in the art.

Since one of the inductive reactances has a greater reactance and, therefore, ordinarily a greater number of turns than the other, it inherently causes one circuit to have a greater resistance than the other. Hence an increase in temperature will produce a greater change in resistance in one of the circuits, thereby affecting unequally the impedances and consequently the relative magnitudes of the currents in the circuits.

The currents in circuits D and A at an increased temperature are represented by curves 3 and 4, which no longer intersect in the 60-cycle ordinate, but at a point X to the left thereof. Consequently at sixty cycles the current in circuit A is greater than that in circuit D and the pointer will move up scale from the mid-frequency or 60-cycle position. Similar errors will be introduced throughout the range of the instrument.

In order to compensate for this error we place strips 28 composed of a temperature sensitive magnetic material across the air gaps 29 in the core 30 of reactance coil 20. The material used may, for example, be a copper nickel alloy such as described in U. S. Patent No. 1,706,172 to Kinnard, issued March 19, 1929, which has a negative temperature coefficient of permeability but it will be understood that other suitable materials may be used. In adjusting the instrument different taps are chosen on the reactance coil so that the resonance curves at normal temperature are as originally shown by curves 1 and 2. As the temperature increases the compensating strips 28 will shunt less flux and the inductance of the coil will be diminished. Since the resonant frequency of a tuned circuit is represented by the equation $$f = \frac{1}{2\pi\sqrt{LC}}$$

where L represents inductance and C represents capacity, it will be obvious that the resonant frequency of circuit A will be increased by the diminution in inductance, causing the resonance curve to be shifted to the right, being represented by curve 5 which intersects curve 3 at the point Y upon the 60-cycle ordinate. The magnitudes of the currents in both circuits are slightly diminished, but are equal so that the instrument will now indicate correctly independently of temperature variations. As the constants of the electrical circuits are so chosen that the resonance frequencies will be well beyond the operating range of the instrument and on either side, the portions of curves 3 and 5 within the operating range will be symmetrical with respect to the 60-cycle ordinate and the compensation will be effective over the entire scale range.

Although we have shown our compensating device in only one circuit, and used to compensate primarily for variations in resistance, it will be understood that our invention is not limited to this exact arrangement.

Furthermore, although we have explained the operation of our invention in connection with an instrument employing tuned circuits in parallel it will be understood that our invention is not limited thereto but is obviously also applicable to any devices in which impedances of parallel circuits are unequally affected by temperature.

In accordance with the provisions of the patent statutes, we have described the principle of operation of our invention, together with the apparatus which we now consider to represent the best embodiment thereof, but we desire to have it understood that the apparatus shown and described is only illustrative and that the invention may be carried out by other arrangements.

What we claim as new and desire to secure by Letters Patent of the United States, is:

1. In a frequency responsive device a pair of electric circuits inherently containing resistance and carrying currents which vary relatively to each other in accordance with variations in frequency, one of said circuits including an inductive reactor the magnetic circuit of which includes a material the permeability of which varies with temperature, causing the self inductance of said reactor to vary to compensate said pair of circuits for unequal temperature variations in resistance of said circuits.

2. In combination, a pair of parallel electric circuits inherently containing resistance, and carrying currents, the relationship between which is to be maintained independent of temperature variations, one of said circuits including an inductive reactor having a magnetic circuit formed in part of a material, the permeability of which varies with temperature, thereby varying the self inductance of said circuits to compensate for unequal varitions of resistance with temperature in said circuits.

3. In combination, a pair of parallel electric circuits, containing resistance and inductive and condensive reactance, means for preserving the relationship of currents carried in said circuits independently of temperature variations, said means comprising temperature sensitive magnetic material forming a portion of the magnetic circuit of one of said inductive reactances and varying the reactance thereof to compensate for unequal temperature variations in said circuits.

4. In combination, a pair of parallel electrical circuits carrying currents, the relationship between which is to be maintained independent of temperature variations, at least one of said circuits including capacitative reactance, one of said circuits including an inductive reactor having included in its magnetic circuit a material the reluctance of which increases with temperature, thereby varying the inductance of said reactor to compensate for unequal variation in said circuits with temperature.

5. In an electrical instrument, a pair of parallel electrical circuits, and means responsive to the relationship between currents carried therein, said circuits comprising inductive reactance, condensive reactance and resistance inherent therein, said reactances having such magnitudes that said circuits have resonant frequencies on either side of the operating range of said instrument, one of said inductive reactances having included in its magnetic circuit a temperature sensitive magnetic material, whereby temperature variations cause a variation in inductance and consequently a shift in the resonance curve of one of said circuits, thereby compensating for unequal variations in said circuits with temperature.

6. In a frequency responsive device, a pair of circuits carrying electric currents, and a device responsive to the relationship therebetween, said circuits having resistance inherent therein and reactances which vary oppositely with frequency within the operating range of said instrument, one of said circuits including a reactance which varies with variations in temperature, thereby shifting the current-frequency curve of said circuit to compensate for unequal temperature variations in said circuits.

7. In a frequency responsive device a pair of electric circuits carrying currents which vary relatively to each other in accordance with variations in frequency, at least one of said circuits including capacitative reactance, one of said circuits including an inductive reactor, the magnetic circuit of which includes a material the permeability of which varies with temperature, causing the inductance of said reactor to vary to compensate for unequal temperature variations in said circuits.

8. In combination, a pair of parallel electrical circuits carrying currents the relationship between which is determined by the impedances of said circuits, at least one of said circuits including capacitative reactance, one of said circuits including a reactance arranged to vary in magnitude with temperature in a manner to compensate for variations with temperature in said circuits.

9. In a frequency responsive device a pair of electric circuits carrying currents which vary relatively to each other in accordance with variations in frequency, at least one of said circuits including capacitative reactance, one of said circuits including a reactance which varies in magnitude with variations in temperature to compensate said circuits for changes in temperature.

EARL W. CLARK.
ERNEST GILBERTSON.

CERTIFICATE OF CORRECTION.

Patent No. 1,947,187.   February 13, 1934.

EARL W. CLARK, ET AL.

It is hereby certified that error appears in the printed specification of the above numbered patent requiring correction as follows: Page 2, line 99, claim 2, for "circuits" read circuit; and that the said Letters Patent should be read with this correction therein that the same may conform to the record of the case in the Patent Office.

Signed and sealed this 20th day of March, A. D. 1934.

F. M. Hopkins (Seal)   Acting Commissioner of Patents.

electric circuits carrying currents which vary relatively to each other in accordance with variations in frequency, at least one of said circuits including capacitative reactance, one of said circuits including an inductive reactor, the magnetic circuit of which includes a material the permeability of which varies with temperature, causing the inductance of said reactor to vary to compensate for unequal temperature variations in said circuits.

8. In combination, a pair of parallel electrical circuits carrying currents the relationship between which is determined by the impedances of said circuits, at least one of said circuits including capacitative reactance, one of said circuits including a reactance arranged to vary in magnitude with temperature in a manner to compensate for variations with temperature in said circuits.

9. In a frequency responsive device a pair of electric circuits carrying currents which vary relatively to each other in accordance with variations in frequency, at least one of said circuits including capacitative reactance, one of said circuits including a reactance which varies in magnitude with variations in temperature to compensate said circuits for changes in temperature.

EARL W. CLARK.
ERNEST GILBERTSON.

CERTIFICATE OF CORRECTION.

Patent No. 1,947,187.  February 13, 1934.

EARL W. CLARK, ET AL.

It is hereby certified that error appears in the printed specification of the above numbered patent requiring correction as follows: Page 2, line 99, claim 2, for "circuits" read circuit; and that the said Letters Patent should be read with this correction therein that the same may conform to the record of the case in the Patent Office.

Signed and sealed this 20th day of March, A. D. 1934.

F. M. Hopkins (Seal)  Acting Commissioner of Patents.